Patented June 17, 1952

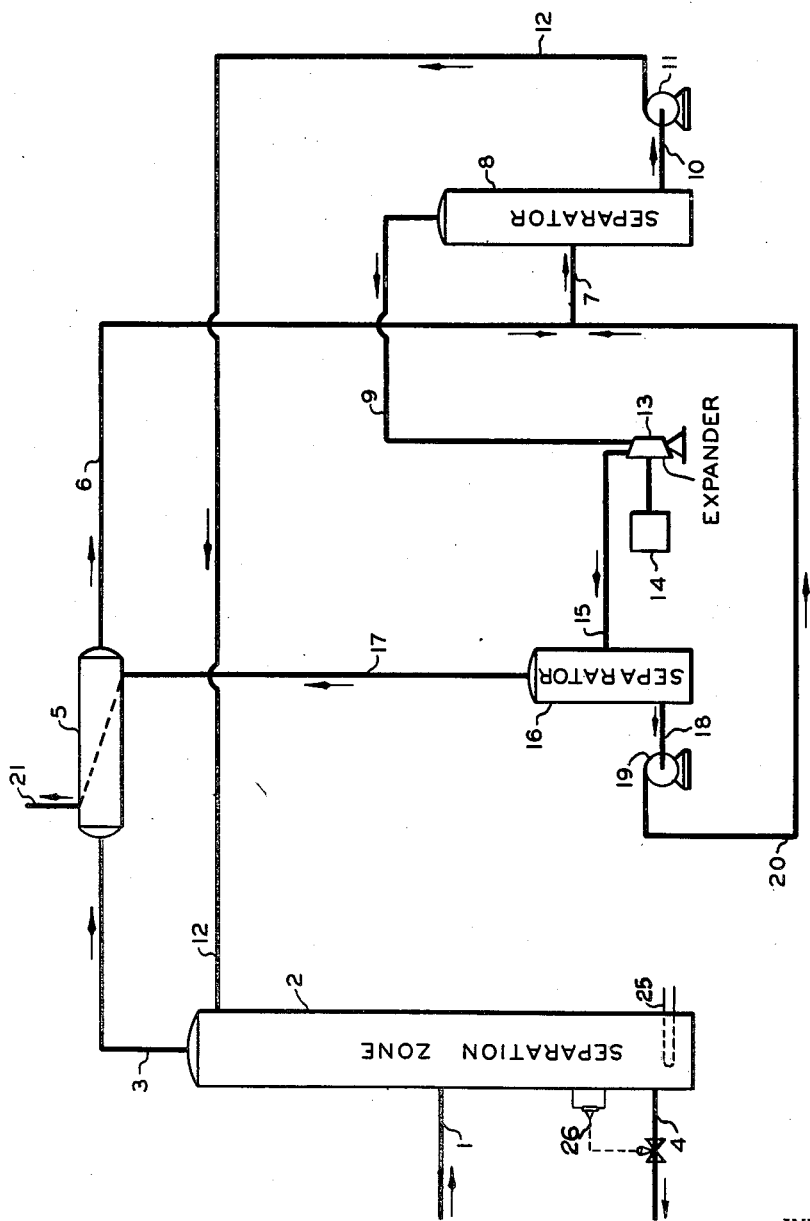

2,600,494

UNITED STATES PATENT OFFICE 2,600,494

LOW-TEMPERATURE SEPARATION PROCESS

Bernardo J. Ferro, Jr., Bartlesville, Okla., assignor to Phillips Petroleum Company, a corporation of Delaware Application December 20, 1948, Serial No. 66,387

9 Claims. (Cl. 62—175.5)

This invention relates to a low temperature separation process. In one of its more specific aspects it relates to the production of reflux liquid for a low temperature separation process. In a still more specific aspect it relates to the production of a reflux liquid for a low temperature fractionation process by the isentropic expansion of overhead vapors from the fractionator.

One object of this invention is to provide a method for the production of liquid for refluxing of a low temperature separation operation.

Another object of my invention is to provide a process for the production of reflux liquid for use in a low temperature separation without need for extraneous refrigeration.

Still another object of my invention is to provide an efficient and economical process for the production of liquid reflux for use in low temperature separation operations without need for extraneous refrigeration.

Yet another object of my invention is to provide a process for the production of liquid reflux for use in refluxing a low temperature separation zone in which at least some of said reflux is produced by the isentropic expansion (reversible adiabatic) of the separation zone vapors.

Still other objects and advantages of my invention will be apparent to those skilled in the art upon reading the following description, which taken with the attached drawing, forms a part of this specification.

This invention resides substantially in the combination, construction, arrangement and relative location of parts, steps and series of steps, all as will be described in detail below.

In the accompanying drawing, the single figure is a diagrammatic and schematic illustration of an apparatus in accordance with this invention.

Referring now to the drawing, a liquid natural gas free from butane and heavier hydrocarbons, hydrogen sulfide, carbon dioxide and moisture and under pressure and containing nitrogen, and from a source, not shown, flows through a line 1 into a separation zone 2. In this separator which is actually a low temperature fractionator, gaseous nitrogen containing some methane is taken overhead through a line 3 while liquid methane (and any hydrocarbons boiling higher than methane, if present) is removed through a line 4 as kettle product. The overhead gases are chilled and partially condensed in exchanger 5 to yield some condensate. This partially condensed mixture is passed through a line 6 and a line 7 into a separator 8 in which liquid and gas are separated.

The saturated gas separated in the separator 8 is passed through a line 9 to an expansion engine 13 in which isentropic expansion accompanied by partial condensation occurs. The expanded fluid produced in this expansion engine with the expenditure of work, flows at a reduced pressure through a line 15 into a second separator 16 in which liquid formed by the isentropic expansion is separated from the residual gas. During this isentropic expansion a marked lowering in temperature occurs, and in the separator 16 gas is separated from the condensate. This separated low temperature gas is used as the chilling agent in heat exchanger 5 and accordingly this gas passes from the separator 16 through a line 17 to the heat exchanger 5 and thence leaves by way of a line 21 for such disposal as desired.

The condensed liquid accumulating in the separator 16 is drawn through a pipe 18 and forced by a pump 19 through a line 20 and line 7 into the accumulator 8. The contents of separator 16 are at a considerably lower temperature than are the contents of separator 8 on account of the isentropic expansion of the material passing through the expansion engine 13. The further chilled liquid from separator 16 on mixing with the partially condensed fluid from line 6 in line 7 results in further condensation of materials of this overhead stream. The combined liquids accumulating in the separator 8 are removed therefrom through a line 10 and are pumped by a pump 11 through a line 12 into the top of the separation zone 2 upon the first tray as reflux.

The expansion engine 13 in order to operate efficiently as a temperature reducing means must perform work, hence, the engine may drive a compressor 14 or do other useful work, as desired.

The heat exchanger 5 can be of any suitable and well known type available in the art and may, for example, consist of a shell and tube exchanger with one fluid flowing through the tubes and a second fluid flowing around the tubes. The overhead vapors from the fractionator 2 at their dew point pass through the line 3 and the tubes to line 6. The vapors delivered by line 17 to heat exchanger 5 fill the chamber surrounding the tubes.

The separators 8 and 16 may be of any type suitable for the purpose of separating partially condensed fluids into vapor and liquid components. There are many devices for this purpose known to the art.

The expansion engine 13 may be of any suitable and available type of turbine or reciprocating expander of which the Kapitza turbine is an example of the former. The expander must be of the type capable of handling fluids containing an appreciable liquid content. Suitable forms of Kapitza turbines are disclosed in U. S. Patent No. 2,280,585, granted April 21, 1942.

The high pressure vapor separated in vessel 8 and delivered by line 9 to the expander 13 is at its dew point or saturation point since it is separated from liquid with which it is in equilibrium. In order to insure the presence of a substantial amount of condensate in the exhaust from the expander 13, the expander must perform work. Hence, a compressor or other power consuming mechanism may be driven by the expander 13 in order that the total heat content of the vapor stream from line 9 be lowered by an amount sufficient to produce an appreciable amount of condensate in the exhaust of the expander. Those skilled in the art will understand that this operation of the expander is in accordance with the second law of thermodynamics. By this method of operating considerably more heat energy is available because of the release of latent heat resulting from the relatively large percentage of condensate formed by what is termed isentropic expansion.

This two-phase stream from the expander 13 is then divided into a vapor phase and a liquid phase in separator 16 and the liquid portion is passed into separator 8. As mentioned hereinbefore, this chilled liquid on entering line 7 combines with the partially condensed overhead stream from line 6 and causes further condensation from this overhead stream. The separation zone overhead vapor in line 3 is at its dew point or saturation point since it is in substantial equilibrium with the liquid on the top tray. Then, on being cooled in heat exchanger 5 some condensate forms and the mixture of condensate and its equilibrium vapor passes from the heat exchanger 5 on through line 6. Upon becoming admixed with the expander condensate from line 20 in line 7 still more condensate forms. In the separator 8 the entire liquid content is separated from the remaining saturated vapors and this separated liquid is pumped by way of lines 10 and 12 to reflux the separation zone 2 while the saturated vapor is the feed to the expansion engine 13.

It will be seen that a system of this type eliminates stepwise or cascade refrigeration cycles commonly used in obtaining low temperatures. It will also be apparent that this system and method may be used for the self condensation of a fraction of the overhead vapor stream, as for refluxing purposes.

The following example is illustrative of the operation of my process when applied to the production of liquid for refluxing a fractionating tower operating to separate nitrogen from a mixture containing largely methane and nitrogen with some ethane and propane.

The following tabulation gives the composition of a feed stock, of the fractionator bottoms, overhead vapor and other streams, and pressure and temperature conditions of operation of the various process steps directed to the production of liquid for refluxing the fractionating column, and is based on 100 mols of feed of which 15.54 mols are withdrawn as overhead product and the remainder as kettle product.

*Table*

| Stream No. | (1) | (4) | (3) | (6) | (7) | (9) | (12) | (15) | (18) | (20) | (17) | (21) |
|---|---|---|---|---|---|---|---|---|---|---|---|---|
| Mol percent: | | | | | | | | | | | | |
| $N_2$ | 15.46 | 1.36 | 75.65 | 75.65 | 69.75 | 81.27 | 38.00 | 81.27 | 29.30 | 29.30 | 92.17 | 92.17 |
| $CH_4$ | 74.84 | 87.17 | 24.35 | 24.35 | 30.25 | 18.73 | 62.00 | 18.73 | 70.70 | 70.70 | 7.83 | 7.83 |
| $C_2H_6$ | 6.02 | 7.11 | | | | | | | | | | |
| $C_3H_8$ | 3.68 | 4.36 | | | | | | | | | | |
| Mols | | | 22.34 | 22.34 | 25.59 | 18.79 | 6.80 | 18.79 | 3.25 | 3.25 | 15.54 | 15.54 |
| State | | | (1) | (2) | (2) | (1) | (3) | (2) | (3) | (4) | (1) | (5) |
| Temperature °F | | | −230.5 | −234.8 | | −236.3 | −236.3 | −293.2 | −293.2 | −291.5 | −293.2 | −235.5 |
| Lbs./sq. in. absolute | | | 200 | 200 | 200 | 200 | 200 | 20 | 20 | 200 | 20 | 20 |
| Mol. Entropy | | | | | | 40.72 | | 40.72 | 13.7 | | 46.4 | |
| Enthalpy | | | 208,470 | 199,670 | 209,670 | 178,720 | 30,950 | 162,950 | 9,850 | 10,000 | 153,100 | 159,900 |

¹ Saturated vapor.
² Partially condensed.
³ Saturated liquid.
⁴ Compressed liquid.
⁵ Superheated vapor.

A feed stock, containing methane and nitrogen with some ethane and propane and having the composition indicated in the stream (1) of the table, is fed at about 200 pounds pressure per square inch absolute into about a midpoint of the fractionator 2. This feed stock is introduced into the fractionator through inlet pipe 1 at approximately its boiling point. The fractionator is operated at about 200 pounds per square inch absolute pressure with a reboiler temperature such that in combination with the tower refluxing yields an overhead vaporous product which leaves the fractionator at a temperature of about −230.5° F. This overhead product is passed through the exchanger 5 in which it passes in indirect heat exchange with cold vapor produced in separator 16. The overhead vapor is cooled from −230.5° F. to −234.8° F. on passing through the exchanger 5. Since overhead vapor from a fractionator is saturated and at its dew point, this even slight chilling in the exchanger 5 causes some condensation. For each 100 mols of feed to the fractionator 22.34 mols are taken overhead at its dew point, and in the exchanger 5, 6,800 B. t. u. are extracted to produce some condensation. This partially condensed overhead stream is then blended with the condensate produced by expander 13 at −291.5° F. and the combined stream passed into the separator 8. In this separator 6.8 mols of liquid are separated at −236.3° F. and returned to the fractionator through line 12 as reflux. The saturated vapor separated from the liquid in vessel 8 is at its dew point, and this vapor at about 200 pounds pressure is passed through the line 9 to the expander 13 in which pressure is reduced to 20 pounds per square inch absolute with a resultant temperature drop from −236.3° F. to −293.2° F. This temperature drop causes condensation of about 3.25 mols of liquid which drops out in the separator 16. This liquid is then pressured by the pump 19 and mixed with the partially condensed stream from line 6 and the mixture passed into the separator 8 as mentioned above. The saturated vapor separated in vessel 16 is removed through line 17 and is passed through exchanger 5 in indirect heat exchange with the fractionator overhead vapors. These separator vapors furnish the 6,800 B. t. u. of cooling mentioned above. The final gaseous product issuing from the exchanger 5 through line 21 consists of 15.54 mols of gas containing 92.17% $N_2$ and 7.83% methane. This gas may be used, if desired, for partial chilling of the feed to the fractionator or for other process steps, not shown. Likewise, the kettle product withdrawn through line 4 may be used in chilling the fractionator feed, while all or a portion of this feed may be passed through a coil, not shown, in the fractionator for furnishing reboiler heat.

The power available from the expansion engine may be utilized to drive compressors, pumps, generators or the like.

One important feature of this cycle is the fact that the expander has a fractionating effect equal to about three fractionator trays. Such an effect is produced by the partial liquefaction of the expander exhaust at a lower pressure than that of the fractionator. Consequently, this refluxing cycle allows a top fractionator tray temperature of −230.5° F. or 18.5° F. higher than the −249° F. top tray temperature required when a conventional partial reflux condenser is used.

It is also possible to eliminate the separator 8, when desirable, in which case the expander condensate from pipe 20 may be mixed with the liquid-vapor stream from pipe 6 and this mixture passed through the expander. In this modification a portion of the expander condensate separated in vessel 16 will then be used for refluxing the fractionator.

This cycle may be used advantageously in an oxygen manufacturing plant where about 80% of the fractionator feed stream is available for expansion as a nitrogen rich overhead product.

The term "separation zone" as applied to element 2 of the drawing is intended to represent any type of suitable separator which is adapted to the problem at hand. The separator 2 disclosed in the specific example is a fractionator which may be provided with conventional bubble cap trays and caps. This separator may be a modified type fractionator, that is, one having a modified tray design in which each tray is a heat exchanger, or a plurality of heat exchange zones in which a liquid and vapor may be brought into intimate contact so as to produce a vapor which is rich in the lower boiling components and a liquid which is rich in the higher boiling components, these two products being withdrawn from the separation zone. In the modification shown, the uncondensed vapor from the isentropic expander is passed in indirect heat exchange with the overhead vapor from the separation zone. In many applications, as in the example shown, the expanded vapor after passing through such a heat exchange step is still at a relatively low temperature and it may be desirable to employ this cold vapor as an indirect heat exchange medium in one or more heat exchange steps within the separation zone.

It will be obvious that the apparatus described herein for use in the process of my invention should be well insulated against absorption of heat from the surroundings. Such insulation is not herein shown, since it is commercially available and its use well understood by those skilled in the art.

Materials of construction may be selected from among those commercially available and adapted to use in high pressure and low temperature applications. Corrosion resistant equipment may usually not be needed since such materials as treated by my process will have previously been freed of corrosive components.

Having disclosed my invention, I claim:

1. A method for the separation of nitrogen from an admixture with higher boiling normally gaseous constituents comprising introducing said admixture at a superatmospheric pressure and at its boiling point under said pressure into a separation zone, removing higher boiling normally aqueous constituents from the separation zone as one product of the process, removing nitrogen containing some of the higher boiling normally gaseous constituents as a first vaporous stream from the separation zone, isentropically expanding a second vaporous stream comprising the nitrogen and some of the higher boiling normally gaseous constituents of said first vaporous stream, to produce some condensate, separating the expanded product into a first liquid and a vapor, returning a second liquid comprising said first liquid to the separation zone as reflux and removing the separated vapor as a second product of the process.

2. The method of claim 1 wherein nitrogen is separated from a mixture containing nitrogen and methane with some ethane and propane.

3. A method for the separation of nitrogen from admixture with higher boiling normally gaseous constituents comprising introducing said admixture at a superatmospheric pressure and at its boiling point under said pressure into a separation zone, removing nitrogen containing some of said higher boiling normally gaseous constituents as a first intermediate vaporous stream and removing the remainder of the higher boiling normally gaseous constituents as one product of the process; chilling said first intermediate vaporous stream in a heat exchange step by indirect heat exchange with an expanded vapor as subsequently produced, separating the chilled intermediate stream into a second intermediate vapor and a first liquid, isentropically expanding said second intermediate vapor to produce some condensate, separating the expanded stream into a third vapor and a second liquid, combining this second liquid with said first liquid and introducing the combined liquid as a reflux into said separation zone; passing said third vapor to said heat exchange step as said expanded vapor as subsequently produced and removing said expanded vapor from said heat exchange step as the separated nitrogen.

4. The process of claim 3 wherein nitrogen is separated from a mixture containing nitrogen, methane and some ethane and propane.

5. A method for the separation of nitrogen from admixture with higher boiling normally gaseous constituents comprising separating said admixture of nitrogen and higher boiling normally gaseous constituents into an intermediate first vaporous stream comprising nitrogen and some of said higher boiling normally gaseous constituents and a first liquid comprising the remainder of said higher boiling normally gaseous constituents and removing said first liquid as one product of the process; isentropically expanding a second intermediate vaporous stream as subsequently produced to produce some condensate, separating the expanded stream into a vaporous fraction and a liquid fraction and removing this latter vaporous fraction as the separated nitrogen of the process; and combining said liquid fraction with said first intermediate vaporous stream prior to said isentropic expansion step, from this combined material separating a second liquid and said second intermediate vaporous stream as subsequently produced and adding said second liquid as reflux to the original separating step.

6. The method of claim 5 wherein nitrogen is separated from a mixture containing nitrogen, methane and some ethane and propane.

7. An apparatus for the separation of one gas from an admixture of gases comprising said one gas and another gas boiling at a higher temperature than said one gas comprising in combination an indirect fractionator, a heat exchange means in an overhead conduit from said fractionator, a first liquid-vapor separator in fluid communication with said overhead conduit, an isentropic expander in fluid communication with said first separator, a second liquid-vapor separator in fluid communication with said isentropic expander, means for transferring liquid from said second separator to said first separator, conduit means from said second separator to said heat exchange means and means for transferring liquid from said first separator to the top portion of said fractionator.

8. A method for the separation of a gas from an admixture with higher boiling normally gaseous constituents comprising introducing said admixture at a superatmospheric pressure and at its boiling point under said pressure into a separation zone, removing higher boiling normally gaseous constituents from the separation zone as one product of the process, removing said gas containing some of said other constituents as a vaporous stream of the separation zone, isentropically expanding a second vaporous stream of said gas containing some higher boiling normally gaseous constituents as subsequently produced to produce some condensate, separating the expanded stream into a liquid and a vapor, combining this latter liquid with the first mentioned vaporous stream, from this combined material separating a vapor as said second vaporous stream of said gas containing some higher boiling normally gaseous constituents as subsequently produced and a liquid, and returning this latter mentioned liquid to the separation zone as reflux and removing the separated vapor of the expansion operation as a second product of the process.

9. A method for the separation of nitrogen from admixture with oxygen in air comprising introducing said admixture at a superatmospheric pressure and at its boiling point under said pressure into a separation zone, removing nitrogen containing some oxygen as a first vapor and removing a liquid comprising oxygen as one product of the process, chilling said first vapor in a heat exchange step by indirect heat exchange with an expanded vapor as subsequently produced, separating the chilled product into a second vapor and a second liquid, isentropically expanding said second vapor to produce some condensate, separating the expanded material into a third vapor and a third liquid, combining this latter liquid with the second liquid and introducing this combined liquid as reflux into said separation zone, passing said third vapor to said heat exchange step as said expanded vapor as subsequently produced, and removing said expanded vapor from said heat exchange step as the separated nitrogen.

BERNARDO J. FERRO, Jr.

REFERENCES CITED

The following references are of record in the file of this patent:

UNITED STATES PATENTS

| Number | Name | Date |
|---|---|---|
| 1,946,580 | Gregory | Feb. 13, 1934 |
| 2,127,004 | Nelson | Aug. 16, 1938 |
| 2,175,590 | Barton | Oct. 10, 1939 |
| 2,270,852 | Schuftan | Jan. 27, 1942 |
| 2,499,043 | Voorhees | Feb. 28, 1950 |